(No Model.)

A. G. PAUL.
AUTOMATIC VALVE.

No. 563,880.                           Patented July 14, 1896.

Witnesses:
Edwin Seger
George W. Mills Jr.

Inventor:—
Andrew G. Paul,
By his Attorneys,
Witter & Kenyon.

UNITED STATES PATENT OFFICE.

ANDREW G. PAUL, OF BOSTON, MASSACHUSETTS, ASSIGNOR TO THE PAUL STEAM SYSTEM COMPANY, OF MAINE.

AUTOMATIC VALVE.

SPECIFICATION forming part of Letters Patent No. 563,880, dated July 14, 1896.

Application filed March 28, 1895. Serial No. 543,471. (No model.)

*To all whom it may concern:*

Be it known that I, ANDREW G. PAUL, a citizen of the United States, and a resident of Boston, in the county of Suffolk and State of Massachusetts, have invented a new and useful Automatic Valve for Use in Connection with Heating Systems and Drying-Machines and Similar Apparatus, of which the following is a full, clear, and exact specification, reference being had to the accompanying drawings, which form a part hereof.

My invention relates to improvements in automatic valves, and is especially applicable for use in connection with steam-heating systems provided with air-pipes where it is desirable to remove the air from the radiators of the system without causing any considerable loss of steam. My improved valve is also adapted for use in connection with devices for removing the water of condensation from the cylinders of drying-machines, such, for example, as is shown in United States Letters Patent No. 526,734, granted to me on October 2, 1894, and with other devices for transferring liquids.

The object of my invention is to automatically control the passage of air, vapor, or water through the air-pipe or escape-pipe, so as to permit the air to escape while preventing the escape of the vapor and water, or so as to permit the air and vapor to escape while preventing the escape of water.

My improvement is fully illustrated in the accompanying drawings, in which—

Figure 1:
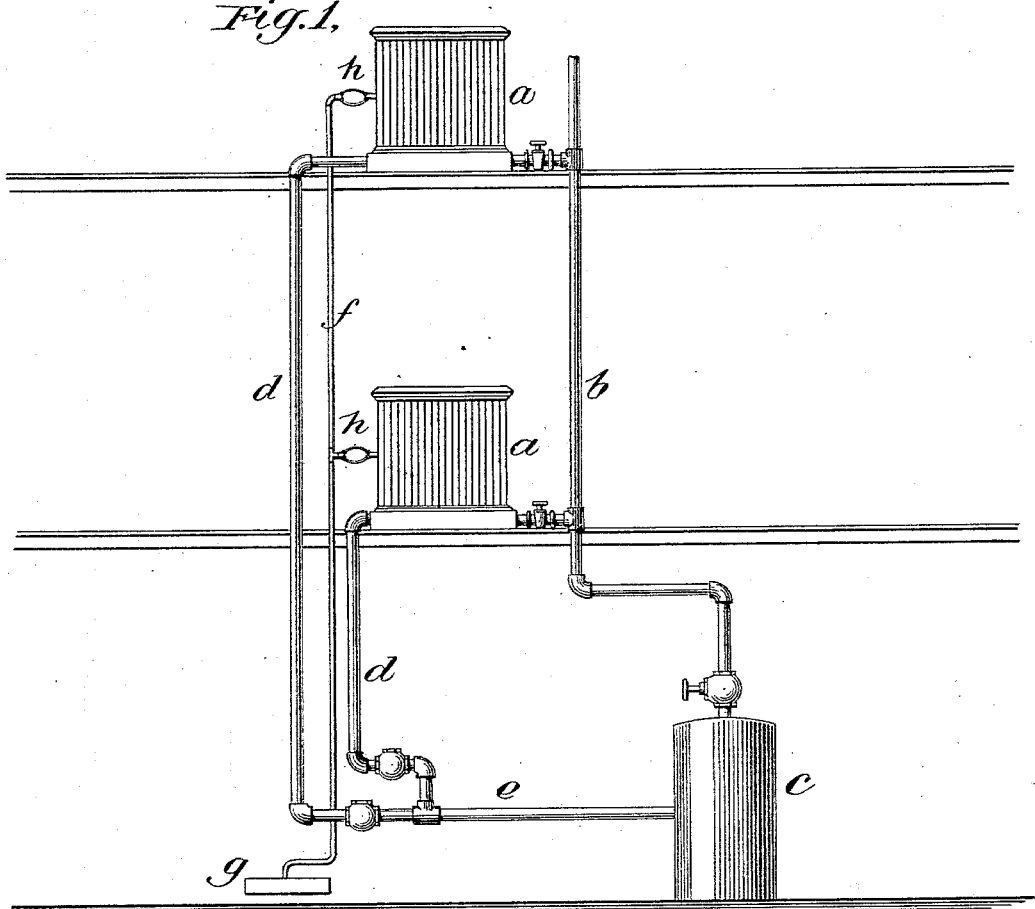
Figure 2:
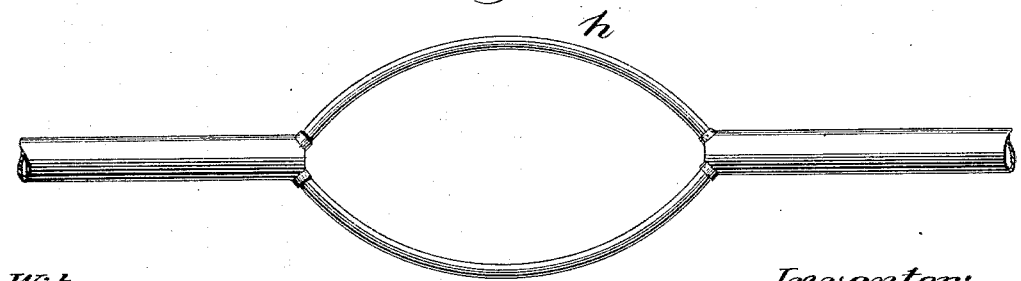
Figure 3:

Figure 1 represents an ordinary steam-heating system on the double-pipe plan provided with an air-pipe and an exhauster at the end of the air-pipe, the air-pipe being suitably connected with the two radiators shown and being provided with my improved valve. Fig. 2 represents the form of my improved valve shown in Fig. 1. Fig. 3 represents a modified form of my improved valve.

Similar letters indicate similar parts in the different figures.

Referring to the drawings, $a\ a$ represent ordinary steam-radiators.

$b$ is the steam-supply pipe leading to the radiators from the boiler $c$.

$d\ d$ are the return-pipes leading from the radiators to the common return-main $e$, which conveys the water of condensation back to the boiler. Suitable valves are provided on the branches of the supply-pipe and suitable check-valves are placed at the lower ends of the various returns.

$f$ is an air-pipe connected with the radiators and provided at its lower end with the exhauster $g$.

$h$ represents my improved valve, which is placed on each branch of the air-pipe near the radiator. It consists of one or more capillary ducts or tubes of considerable length. These capillary ducts or tubes are placed at some suitable point in the air-pipe and connect the passage of the air-pipe on one side of the valve with the passage of the air-pipe on the other side of the valve. In the form shown in Figs. 1 and 2 the valve consists of two curved capillary ducts or tubes. In the form shown in Fig. 3 the valve consists of a single straight capillary duct or tube. Where the duct or tube is made straight, it is made somewhat longer than where it is in the curved form. I have found in practice that a satisfactory valve of the form shown in Figs. 1 and 2 is produced by making these curved capillary ducts about two inches long and the passage-way of the duct about one sixty-fourth of an inch in diameter. In the form shown in Fig. 3 the duct is made somewhat longer, say three and one-half inches long, but of the same diameter.

The operation of my improved valve in connection with such a heating system is as follows: The exhauster being in operation, the air will be drawn out from the radiator through the air-pipe and valve. As soon as the air has been exhausted the steam enters the capillary duct or ducts and passes through the same with a speed dependent partly upon the difference between the pressure in the radiator and the pressure in the air-pipe on the other side of the valve. Owing to the length of the capillary duct and its extremely small diameter or cross-section, the condensing-surface of the duct is very large as compared with its cross-sectional area or as compared with the size of the current of steam passing through it. In consequence of this the steam will be rapidly condensed and the water of condensation will gather in the duct until a globule of water has been formed sufficient to fill the duct. This water acts as a valve and substantially closes the duct and prevents or greatly retards the passage of the steam through the duct. By reason of the small size of the duct its walls or sides exert a sort of capillary attraction upon the water of condensation, and tend to prevent it from being forced through the duct into the air-pipe. The escape of steam through the valve is thus substantially prevented. When air begins to collect again in the radiator or in the valve-passage near the plug, condensation in the duct ceases, and whatever water of condensation may have been formed therein escapes slowly from the duct either back into the radiator or into the air-pipe. As soon as the duct has been partly or wholly freed from this water of condensation air escapes through the duct until the steam again flows into the duct, when the operation already explained is repeated.

My invention provides means for automatically permitting the escape of air while substantially preventing the escape of steam. This prevention of the escape of steam increases the economy of the system by saving the heating-vehicle from waste.

My invention is simple in construction and operation and is not liable to get out of order or to be injured by great variations of pressure or temperature.

When my valve is employed in connection with the escape-pipe of an apparatus for discharging the water from drying-machines, such as is shown in my prior patent, No. 526,734, above referred to, or in connection with other devices for transferring liquid in which it is necessary to remove from the discharge-pipe not merely the air, but also the steam or vapor contained therein, the capillary duct is made larger in diameter, so as to decrease the ratio between the surface of the duct and its sectional area or the size of the current passing through it. The condensing-surface of the duct is thereby reduced in proportion to the volume of vapor passing through it, and this is done sufficiently to prevent the condensing of any large portion of steam in the ducts. In consequence of this change or modification the air and vapor or steam will readily pass through the duct. When, however, water enters the duct, the passage of the water through it will be substantially prevented by reason of the capillary action of the duct.

Even where my invention is used in connection with steam-heating systems to permit the escape of air and to prevent the escape of steam the dimensions of the duct or ducts may be somewhat varied so long as the essential features of construction and operation are retained.

In the best form of my invention the duct or ducts are curved, as shown in Figs. 1 and 2. This feature of construction increases the condensing and retarding action of the duct or ducts.

What I claim as new, and desire to secure by Letters Patent, is—

1. An automatic valve to permit the escape of air while preventing the escape of the water of condensation consisting of one or more capillary ducts of considerable length, substantially as set forth.

2. An automatic valve to permit the escape of air while preventing the escape of the water of condensation consisting of one or more curved capillary ducts of considerable length, substantially as set forth.

3. An automatic valve to permit the escape of air from a heating system while preventing the escape of steam, consisting of one or more condensing capillary ducts of considerable length, substantially as set forth.

4. The combination with a steam heating or drying system, which is provided with radiators or heaters, a supply pipe or pipes to admit the steam, a return or discharge pipe or pipes for the escape of the water of condensation, an escape-pipe for the air, of an automatic valve on the escape-pipe consisting of one or more capillary ducts of considerable length, substantially as set forth.

5. The combination with a steam-heating system, which is provided with radiators, supply and return pipes, an air-pipe in addition to the supply and return pipes, of an automatic valve on the air-pipe, consisting of one or more condensing capillary ducts of considerable length, substantially as set forth.

6. The combination with a steam-heating system, which is provided with radiators, supply and return pipes, an air-pipe in addition to the supply and return pipes, and an exhauster for drawing air from the system through the air-pipe, of an automatic valve on the air-pipe consisting of curved condensing capillary ducts of considerable length, substantially as set forth.

ANDREW G. PAUL.

Witnesses:
T. W. BRUCE,
A. J. CORBETT.